United States Patent [19]
Kowalczyk et al.

[11] Patent Number: 4,744,669
[45] Date of Patent: May 17, 1988

[54] MIXING AND EXTRUDING APPARATUS AND METHODS

[75] Inventors: James E. Kowalczyk; Bernard A. Loomans, both of Saginaw, Mich.

[73] Assignee: Baker Perkins, Inc., Saginaw, Mich.

[21] Appl. No.: 922,202

[22] Filed: Oct. 23, 1986

[51] Int. Cl.⁴ ............................................. B28C 7/16
[52] U.S. Cl. ................................... 366/77; 222/413; 366/85; 366/88; 366/301
[58] Field of Search ..................... 366/77, 85, 83, 84, 366/86, 87, 88, 89, 97, 297, 298, 299, 301, 300, 303, 306, 319, 329, 323; 425/204, 205, 207, 208; 222/1, 255, 413

[56] References Cited

U.S. PATENT DOCUMENTS 3,195,868  7/1965  Loomans ........................... 366/85
3,216,706  11/1965 Loomans ........................... 366/85
3,383,015  5/1968  Miler ................................ 222/1
3,779,522  12/1973 Loomans ........................... 366/85
3,802,670  4/1974  Okada et al. ....................... 366/77

Primary Examiner—Robert W. Jenkins
Attorney, Agent, or Firm—Learman & McCulloch

[57] ABSTRACT

Material mixing apparatus and methods wherein a barrel defines a mixing chamber, a pair of parallel mixing shafts extend within the barrel chamber and are driven in the same direction of rotation and at the same speed of rotation, mixing elements are on each of the shafts in radial interwiping relation, the barrel has a pair of radially separated, reduced cross-section, annular discharge chambers through which the shafts extend, and one of the discharge chambers has a radial discharge port interjacent its ends, the barrel has a cross-sectionally enlarged end pass chamber through which the shafts further extend at the ends of the discharge chambers, the end pass chamber being of such cross-sectional volume relative to the conveying capacity of the other discharge chamber, as to operate in a partially starved mode at substantially atmospheric pressure, radially aligned paddle portions are on each of the shafts in the end pass chamber, shaped to wipe one another and the end pass chamber wall, one of the shafts has flights pitched to advance material from the mixing chamber through one of the discharge chambers to the end pass chamber, and the other of the shafts has helical flights thereon pitched to advance material from the mixing chamber to the radial discharge port, and also has helical flights of opposing hand pitched to advance material from the paddle portions in the end pass chamber to the radial discharge port.

8 Claims, 2 Drawing Sheets

MIXING AND EXTRUDING APPARATUS AND METHODS

BACKGROUND OF THE INVENTION

This invention relates to continuous mixing and extruding systems, wherein materials are charged to the mixer at one end, and continuously discharged at the other. Moreover, the invention relates particularly to mixers for critical material, such as high energy fuels, which are potentially explosive.

Mixers, of the character to which this invention relates, employ twin shafts, rotating in the same direction and at the same speed, which have radially interengaging paddles which wipe both the opposing paddle surfaces and the mixing barrel surfaces. Mixers of this type are described in the present assignee's expired Loomans, U.S. Pat. No. 3,195,868. Also known is the radial dispensing or discharging mechanism disclosed in the present assignee's U.S. Pat. No. 3,383,015.

To our knowledge, however, no one has marketed a mixer which employed a dispensing system of the type disclosed in U.S. Pat. No. 3,383,015, and it is apparent to us that the system disclosed in U.S. Pat. No. 3,383,015 is not satisfactory for mixing the materials which the system to be presently disclosed will satisfactorily mix.

SUMMARY OF THE INVENTION

At its outlet or dispensing end, the present mixer is provided with separated, reduced diameter, conveying and extruding screw chambers communicating with an end pass chamber of enlarged diameter, relative to the conveying and extruding chambers. Co-wiping transfer paddles, backed by co-wiping flights of opposing hand, control the transfer of the material within the enlarged end pass chamber. In one embodiment of the invention, an intermeshing, counter-rotating discharging screw configuration, complementary to and coacting with the discharging, extruding screw sections, is employed to enhance final extrusion through the radial discharge port.

One of the prime objects of the present invention is to provide a workable mixer-extruder for critical materials which maintains a continuous flow from the entrance end of the system to the discharge end, and avoids the formation of dead spots in the mixer in which material can collect and degradate.

Another object of the invention is to provide a mixer-extruder which uses a unique, so-called end pass chamber wherein co-wiping mixer paddles maintain the blend of the material, while positively transferring it to the discharge extruder screw.

Another object of the invention is to provide such a system with a unique end pass chamber, which is of considerably enlarged capacity with respect to the screw and screw chamber which feeds it, so that the end pass chamber can operate at substantially atmospheric pressure in a partially starved mode, and which incorporates blending and transfer paddles whose action is enhanced by opposing hand helical flights which function to maintain the material in the transfer paddles.

Still another object of the invention is to provide a well-designed and economically manufactured, virtually self-wiping, temperature controlled, mixer of the character described, which at the downstream end of the mixer shafts need not employ high pressure seals and can utilize stuffing glands of conventional and economic character.

A further object of the invention is to design a mixer-extruder of continuous flow character which supports the co-rotating shafts with radial bearings in a manner to prevent metal-to-metal contact and the consequent danger which arises from hot spots when potentially explosive materials are being blended, and which further avoids the need for expensive and difficult-to-maintain thrust bearings in the gearbox.

Other objects and advantages of the invention will be pointed out specifically or will become apparent from the following description when it is considered in conjunction with the appended claims and the accompanying drawings.

IN THE DRAWINGS

Figure 1:
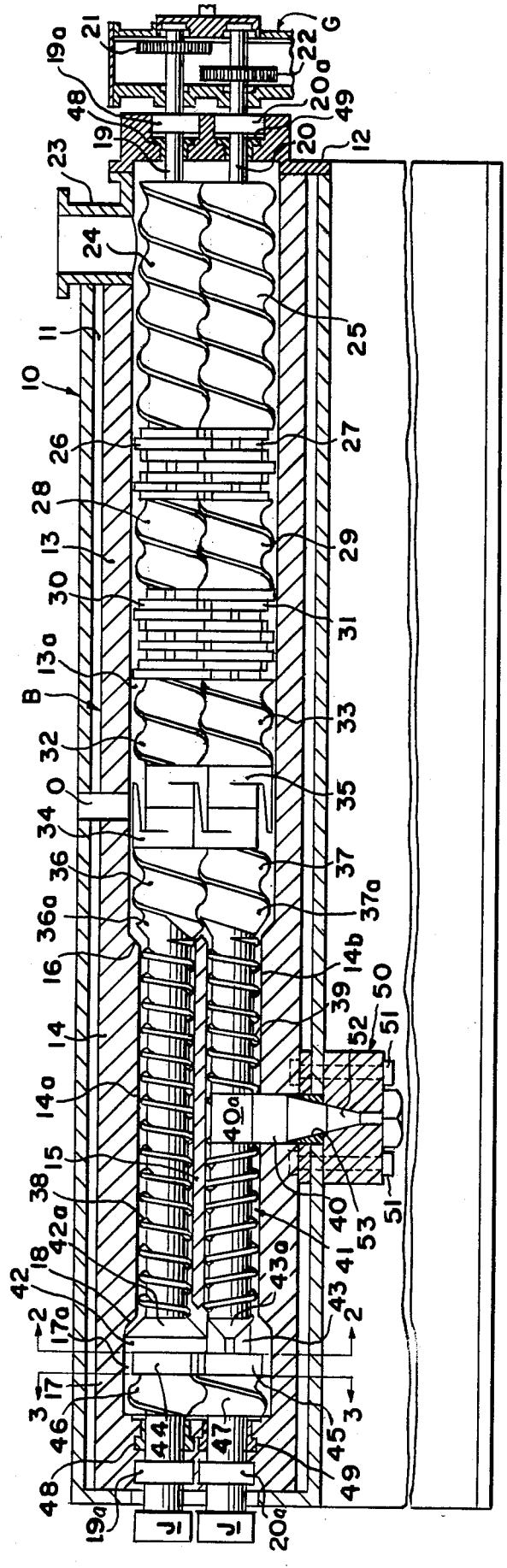
FIG. 1 is a schematic, sectional, elevational view illustrating a mixer-extruder of the character described.
Figure 2:
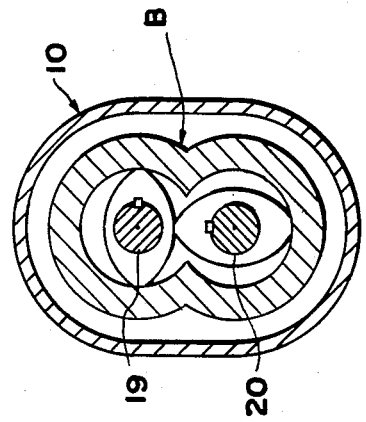
FIG. 2 is an enlarged, transverse, sectional view, taken on the line 2—2 of FIG. 1.
Figure 3:
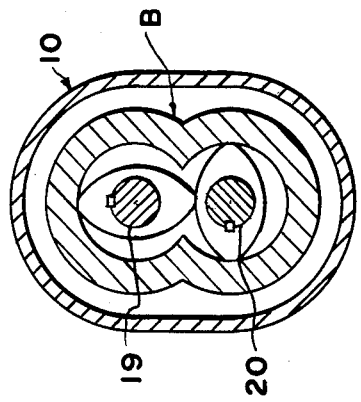
FIG. 3 is an enlarged, transverse, sectional view, taken on the line 3—3 of FIG. 1.

Referring now more particularly to the accompanying drawings, I have disclosed a mixing barrel housing, generally designated 10, which can be jacketed or cored as at 11 to permit the circulation of a suitable liquid coolant which may be water or any other temperature control medium. Provided within the housing 10, which is supported on the machine frame 12, is a figure 8-shaped barrel B having a barrel portion 13, defining a figure 8-shaped mixing chamber 13a. At the discharge end of chamber 13a, a pair of annular, independent, reduced diameter screw chamber 14a and 14b are provided in a discharge section 14 of the barrel B to extend axially from the chamber 13a, chambers 14a and 14b being separated one from the other by a wall 15. A transition section 16 is provided within barrel B between the mixing chamber 13a and the chambers 14a and 14b.

Provided downstream from the axially extending chambers 14a and 14b, is an end pass chamber 17a in the downstream end portion 17 of barrel B. A transition portion 18 for end pass chamber 17a is provided in the barrel B leading from the two separate chambers 14a and 14b to the end pass chamber or cavity 17a, which is of FIG. 8 cross-section and of the same size as the mixing portion 13 of the barrel B. Section 18 which leads from the two annular bores 14a and 14b is of progressively increasing FIG. 8 cross-section.

Provided to extend axially through the chambers 13a, 14a, 14b, and 17a are twin shafts 19 and 20, which are supported in roller bearings 19a and 20a suitably provided at both ends of the machine. Gears 21 and 22, keyed to the shafts 19 and 20, can be suitably driven by a suitable motor (not shown) via gears in a gear box G, to rotate the shafts 19 and 20 in the same direction of rotation, and at the same speed.

Provided at the charge (right) end of the machine is a material supply passage 23, which can be connected in known manner to any continuous supply of material to be mixed or blended in the mixer-extruder. The shafts 19 and 20, at the upstream end of the mixer, have intermeshing, advancing screw sections 24 and 25 of lenticular cross-section keyed thereon in the usual manner. Immediately downstream of the advancing screw sections 24 and 25, are a series of pairs of lenticular mixing paddle elements, keyed to the shafts 19 and 20 in radially interengaging relationship at right angles one to the other. These mixing paddles 26 and 27, which are of the configuration disclosed in the aforementioned Loomans patent, wipe one another, and further wipe the interior wall of the mixer, as do the advancing screw sections 24 and 25. Downstream from paddle sections 26 and 27 are advancing screw sections 28 and 29 of the same configuration as screw sections 24 and 25, and downstream from the screw sections 28 and 29 are further lenticular mixing paddles 30 and 31 of the same configuration as paddles 26 and 27. The sets of paddles 30 and 31 are followed by screw sections 32 and 33 of the same configuration as sections 24 and 25, and downstream therefrom are further mixing paddle members 34 and 35, opposite a vent opening 0 which permits the venting of air, or gases which have developed during the mixing process and are to be drawn off.

Downstream from the paddle sections 34 and 35, provided in the terminal end of the mixing chamber 13a, are intermeshing screw sections 36 and 37 of the same lenticular cross-section as sections 24 and 25, which, at their terminal ends, have transition flight portions 36a and 37a of reduced diameter to conform to and wipe the walls of transition surface 16.

The shaft portions 21 and 22 within chambers 14a and 14b are provided with material conveying flights. In the chamber 14a, the shaft 19 is provided with single lead helical conveying flights 38 of the same hand as screw sections 36–37, extending from the transition section 16 of progressively decreasing figure 8 cross-section to the transition section 18. The flights 38 convey the material via drag forces only without pressure generation. In the extrusion chamber 14b, the shaft 20 is provided, for a portion of its length, with twin lead helical flights 39, and, downstream from a radial discharge orifice or port 40, twin lead flights 41, which are identical to the flights 39, except that they are of opposite hand. Provided axially between flights 39 and 41 is an annular space or chamber 40a of a predetermined volume, which will receive material in the volume delivered under pressure by both flights 39 and 40 and express it radially in a continuous stream.

Provided on the shafts 19 and 20, within the end pass chamber 17a, are a first set of mating, interwiping paddles of lenticular cross section 42 and 43, each of which includes a transition section 42a and 43a, respectively, of the same progressively increasing cross-section. Operating in radially interengaging relationship in the end pass chamber 17a immediately downstream of the paddles 42 and 43, are mixing and blending transfer paddles 44 and 45 of lenticular cross-section, which similarly may be keyed to the shafts 19 and 20.

Finally, and also provided on each of the shafts 19 and 20, is a helical flight portion, designated 46 on the shaft 19 and 47 on the shaft 20, which is of the same size as the screw sections 32 and 33, for example, but of opposite hand. Conventional low pressure stuffing glands 48 and 49 are all that are necessary at both ends of the machine, inasmuch as the screw sections 46 and 47 are never filled with material, so there is never any material axial pressure on the seals or glands 48 and 49.

Connected to the housing wall 10, opposite the radial outlet opening 40 in the barrel section 14, is an extruding orifice block 50, which can be bolted in position as at 51, and which provides an extruding orifice 52 of a particular size or configuration. A nozzle block 53, which is provided in the housing 10, functions as a channeling device in the usual manner. Of course, blocks 50 may be of varying design to obtain the desired output streams.

THE OPERATION

In operation, material fed through the supply or inlet opening 23 is advanced by the screw sections 24 and 25, from right to left in FIG. 1, and moved by the various screws 28–29, 32–33, and 36–37 through the mixing channel 13a. The material is mixed or blended by the paddle sections 26–27, 30–31, and 34–35, paddles 34 and 35 functioning to, also, permit the escape of gases, without loss of material, through the vent opening O.

The mixed and blended material proceeds to the separate annular chambers 14a and 14b, and is conveyed therein. Material in the chamber 14a passes through the transition mixer paddles 42 and 43, and to the mixer paddles 44 and 45, which transfer it to the extruder flights 41. This material is then positively conveyed under pressure to the chamber 40a, where it meets material being advanced under positive pressure by the extruder flights 39, with the result that the increased volume of material is forced in a continuous stream and under high radial pressure, out the extruding ports 40, 53 and 52. Approximately fifty percent of the material proceeding through the system is conveyed by flights 41 and approximately fifty percent by flights 39. The end pass chamber 17a has four times the conveying capacity of extruding chamber 14a, so the material in the chamber 17a is essentially transferred at substantially atmospheric pressure and does not exert any substantial axial pressure on glands 48 and 49 which would tend to force material past the glands to the bearings 19a and 20a. The transfer paddles 42–43 and 44–45, thus, maintain the blend of the material while operating in a partially starved mode at all times. Flights 46 and 47 essentially ensure that no material passes axially beyond paddles 44–45.

With potentially explosive materials involved, it is important to avoid hot spots within the mixer and to have virtually all of the material contacting surfaces continuously wiped. The present system also permits radial discharge at virtually any radial location on the periphery of the barrel. It, further, minimizes shaft deflection, while avoiding metal-to-metal contact of the rotating parts and the barrel, and any consequent friction and galling. With the present design, rotary joints J can be coupled to the ends of shafts 19 and 20, outboard of bearings 19a and 20a, to permit the circulation of a temperature controlling medium through passages in the shafts 19 and 20.

THE FURTHER EMBODIMENT

Figure 4:
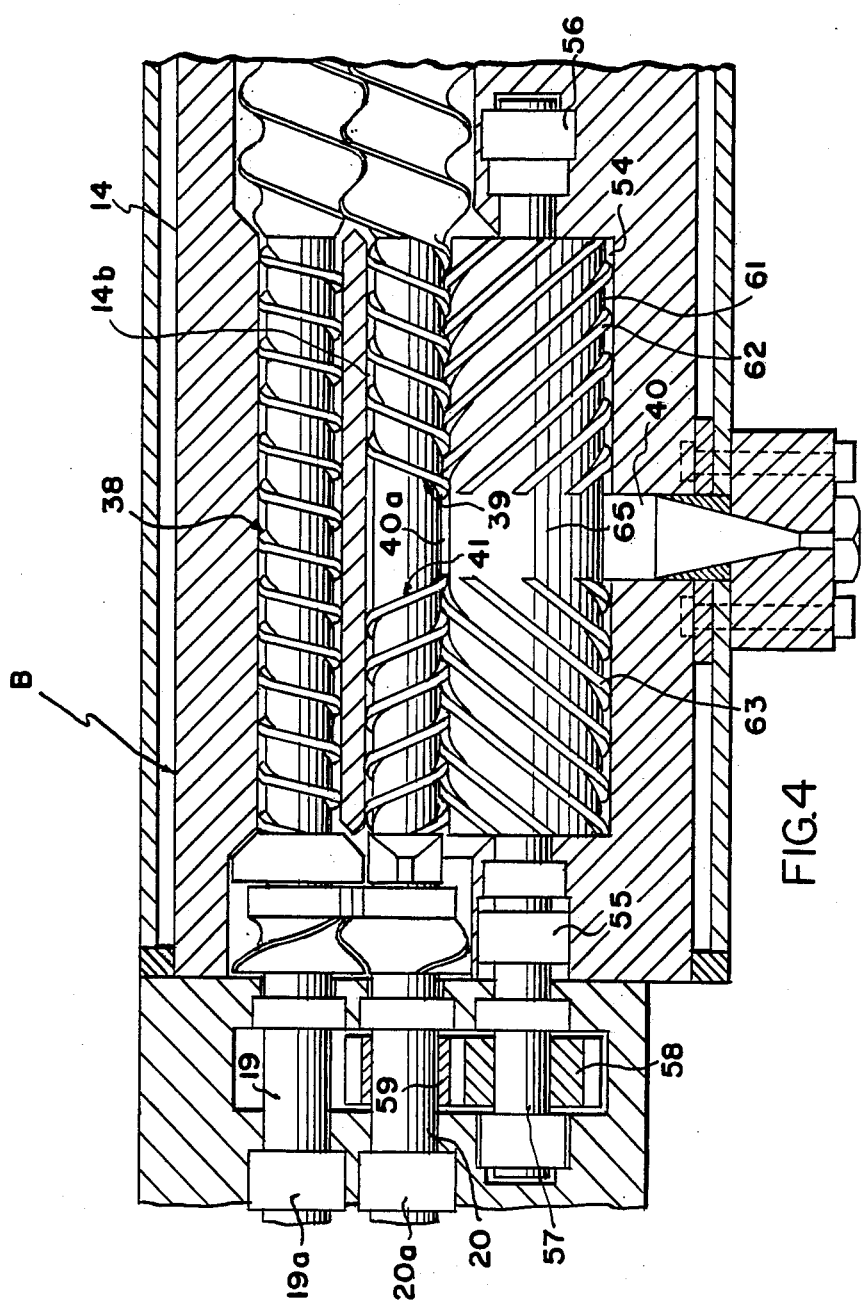
FIG. 4 is an enlarged, fragmentary, schematic sectional elevational view, illustrating a further embodiment of the invention which is used with some materials.

In FIG. 4, I have, for the sake of convenience, used the same numerals to designate the same mechanism. In this embodiment of the invention, the barrel portion 14 is enlarged, and the chamber 14b is radially connected with an enlarged diameter chamber 54. Chambers 14b and 54 communicate to form a composite figure 8-shaped chamber, with the one portion 54 of considerably greater diameter, i.e. three times greater. Supported by bearings 55 and 56, in any suitable manner, is a third shaft 57, driven by a drive gear 58 from a drive gear 59 on shaft 20. Because drive gear 59 is keyed to shaft 20, drive gear 58, which is keyed to shaft 57, will drive the shaft 57 in a direction of rotation opposite the direction of rotation of shafts 19 and 20.

Keyed to the shaft 57 is a screw sleeve 61, which has twin lead helical flights 62 intermeshed with the helical flights 39, and twin lead helical flights 63, of opposite hand, intermeshed with the helical flights 41. The flights 62 extend at the same helical angle as flights 39, and the flights 63 extend at the same helical angle as flights 41. The flights 39 and 41 are axially spaced apart as previously, to provide a first annular radial discharge space or chamber 40a. The flights 62 and 63 are similarly spaced apart, to provide a second annular radial discharge space or chamber 65 between them which leads to discharge port 40. The flights 62 wipe the flights 39 in one end of the chamber 54, and the flights 63 wipe the flights 41 in the opposite end of the chamber 54. Flights 62 tend to remove material from the flights 39, and flights 63 to remove material from the flights 41, and convey this material in opposite directions to the annular space 65. The element 61 is particularly useful with materials which are somewhat slippery, and will be found to considerably enhance the operation of the mixer-extruder when such material is being processed.

While one embodiment of the invention has been described in detail, it will be apparent to those skilled in the art that the disclosed embodiment may be modified. Therefore, the foregoing description in all aspects is to be considered exemplary rather than limiting in any way, and the true scope of the invention is that defined in the following claims.

What is claimed is:

1. Material mixing apparatus comprising:
   a. an elongate, axially extending barrel with an interior wall defining a mixing chamber adapted to receive, mix, and discharge material, and having an inlet in an inlet end and an outlet in an outlet end;
   b. mechanism including at least a pair of parallel mixing shafts extending within said barrel chamber from the inlet end to the outlet end, and drive elements for driving said shafts in the same direction of rotation and at the same speed of rotation;
   c. mixing elements on each of said shafts which are in radial interwiping relation within said barrel and configured to wipe one another and the chamber wall;
   d. said barrel having at least a pair of radially separated, reduced cross-section, discharge chambers through which said shafts extend axially from the outlet end of said mixing chamber and axially aligned therewith to receive said shafts, one of said discharge chambers having a radial discharge port interjacent its ends;
   e. said barrel having a cross-sectionally enlarged end pass chamber through which said shafts extend at the ends of said discharge chambers remote from said mixing chamber, said chamber being of such cross-sectional volume relative to the conveying capacity of the other discharge chamber as to operate in a partially starved mode at substantially atmospheric pressure;
   f. radially aligned paddle portions on each of said shafts in said end pass chamber, shaped to wipe one another and said end pass chamber wall;
   g. the shaft passing through said other discharge chamber having flights thereon pitched to advance material from said mixing chamber through said other of said discharge chambers to said end pass chamber;
   h. the shaft extending in said one discharge chamber having helical flights thereon pitched to advance material in said one discharge chamber from said mixing chamber to said radial discharge port, and also having helical flights thereon of opposing hand pitched to advance material from said paddle portions in said end pass chamber to said radial discharge port;
   i. a helical flight, of an enlarged diameter relative to said flights on said one shaft and of opposite hand thereto, configured to wipe the wall of said end pass chamber and force material in a direction opposite to the flights on said one shaft;
   j. a helical flight, in interwiping relationship with said helical flight of enlarged diameter, and of the same hand as said helical flights of opposing hand on said other shaft, also of enlarged diameter and configured to wipe the wall of said end pass chamber and force material in a direction toward said helical flights of opposing hand on said other shaft;
   k. seal and bearing means for sealing and journaling the upstream ends of said shafts; and
   l. seal and bearing means outboard of said helical flights of enlarged diameter for sealing and journaling the downstream ends of said shafts.

2. The mixer of claim 1 wherein said mixing elements include radially interwiping, helical screw sections of lenticular cross-section.

3. The mixer of claim 1 wherein said mixing elements include radially interwiping lenticular paddles.

4. The mixer of claim 1 wherein said paddle portions in said end pass chamber are of lenticular cross-section.

5. The mixer of claim 1 wherein said helical flights in said end pass chamber are both of lenticular cross-section.

6. The mixer of claim 1 wherein said flights of opposite hand on said other shaft are axially spaced apart to provide a first annular radial extruding outlet therebetween and said discharge chamber for said other shaft is enlarged radially on the side of said other shaft opposite said one shaft; a third shaft extends axially in said radially enlarged portion; flights of greatly increased diameter and opposite hand, on opposite ends of said third shaft, are spaced apart to provide an increased diameter, second annular radial extruding outlet therebetween communicating with said first radial extruding outlet and with said discharge port, said flights on the third shaft intermeshing with and wiping the flights on said other shaft, and means for driving said third shaft.

7. The mixer of claim 6 wherein said third shaft is driven at a speed of rotation related to the speed of rotation of said pair of shafts.

8. A method of mixing material in an elongate, axially extending barrel defining a mixing chamber having an inlet in an inlet end and an outlet in an outlet end, there being at least a pair of parallel mixing shafts extending within said barrel chamber from the inlet end to the outlet end, and drive elements for driving said shaft in the same direction of rotation and at the same speed of rotation; there being also advancing and mixing elements on each of said shafts which are in radial interwiping relation within said barrel and configured to wipe one another and the chamber wall; said barrel having at least a pair of radially separated, reduced cross-section, discharge chambers through which said shafts extend from the outlet end of said mixing chamber, one of said discharge chambers having a radial discharge port interjacent its ends; said barrel having a single, cross-sectionally enlarged end pass chamber open to both discharge chambers through which both shafts further extend, said end pass chamber being of such cross-sectional volume relative to the conveying capacity of the other discharge chamber as to operate in a partially starved mode at substantially atmospheric pressure, there also being radially aligned, transfer paddle portions on each of said shafts in said end pass chamber, shaped to wipe one another and said end pass chamber walls, one of said shafts having flights thereon pitched to advance material from said mixing chamber through one of said discharge chambers to said end pass chamber, the other of said shafts having helical flights thereon pitched to advance material from said mixing chamber to said radial discharge port, and also having helical flights thereon of opposing hand pitched to advance material from said paddle portions in said end pass chamber to said radial discharge port, the steps of:

a. continuously advancing material from the inlet through the barrel mixing chamber to the outlet while mixing it;

b. dividing the material proceeding out the said outlet;

c. advancing approximately half the material in a first flow through one of the discharge chambers to the end pass chamber;

d. advancing the remainder of the material under a positive advancing pressure in a second flow through the other discharge chamber to the discharge port;

e. transferring the first material flow through the end pass chamber to the other discharge chamber with the transfer paddle portions operating in a partially starved mode in which the end pass chamber remains only partially filled with material so the material is maintained substantially at atmospheric pressure;

f. advancing the first flow material received from the end pass chamber along the said other discharge chamber under a positive advancing pressure in a direction toward the discharge port in opposition to the said second flow of material; and g. extruding said flows of material out said discharge port.

* * * * *